Figure 1:
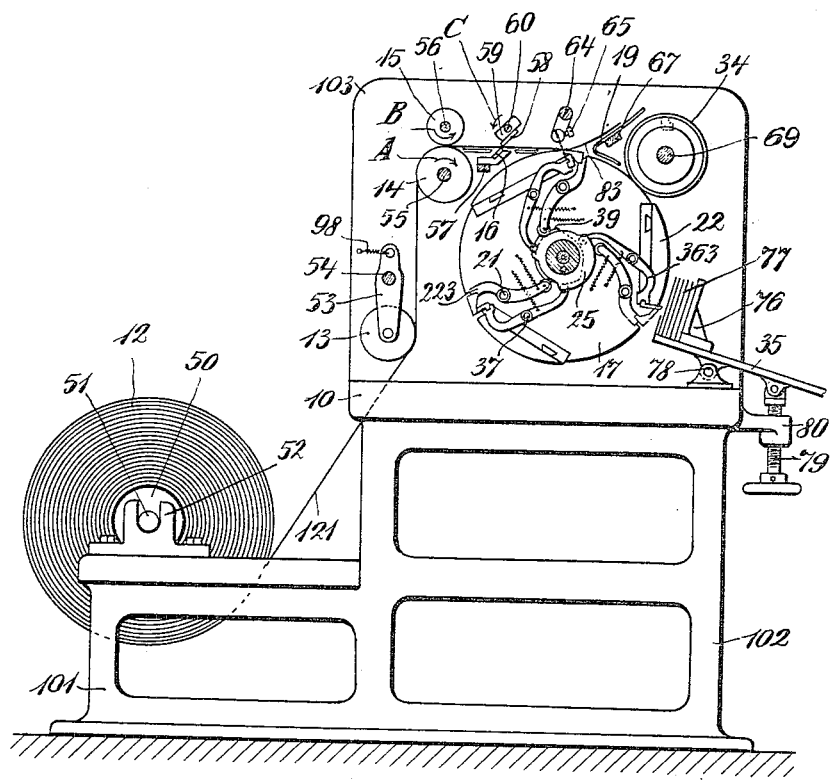

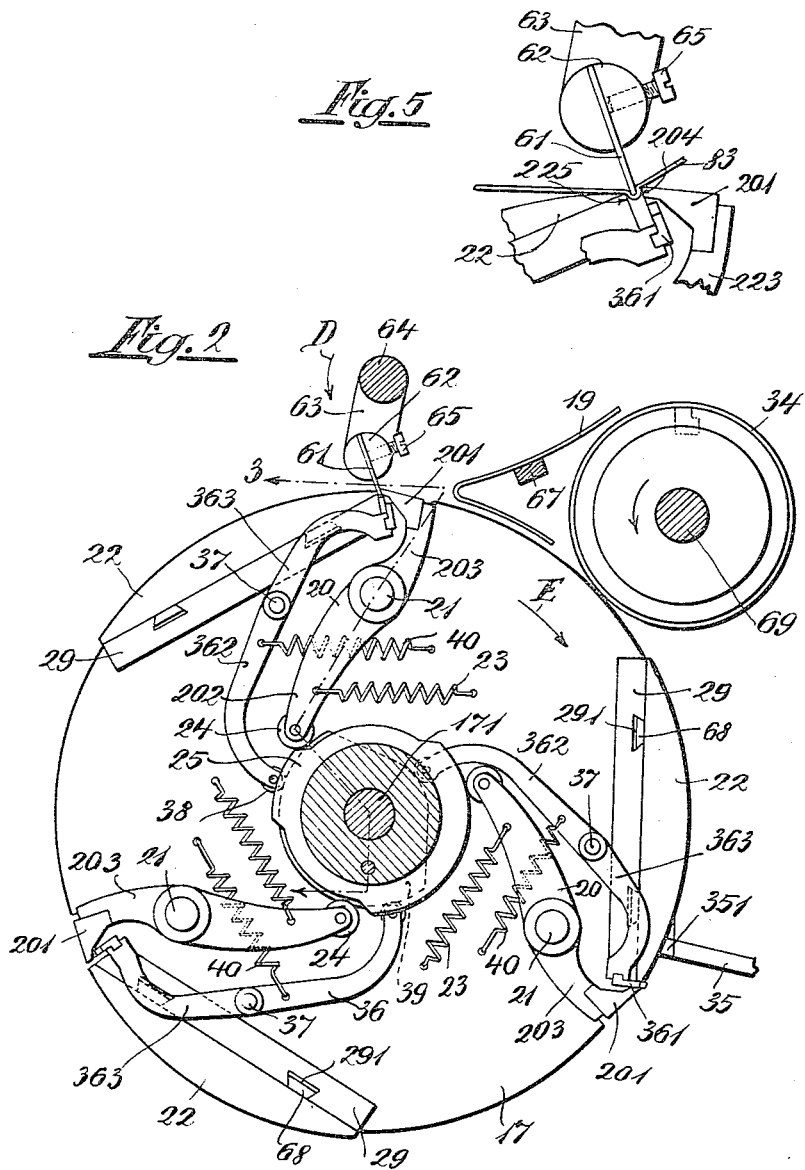

Jan. 24, 1956   P. WEISSHUHN ET AL   2,731,891
MACHINES FOR SEALING BAGS
Filed Sept. 23, 1952   4 Sheets-Sheet 3
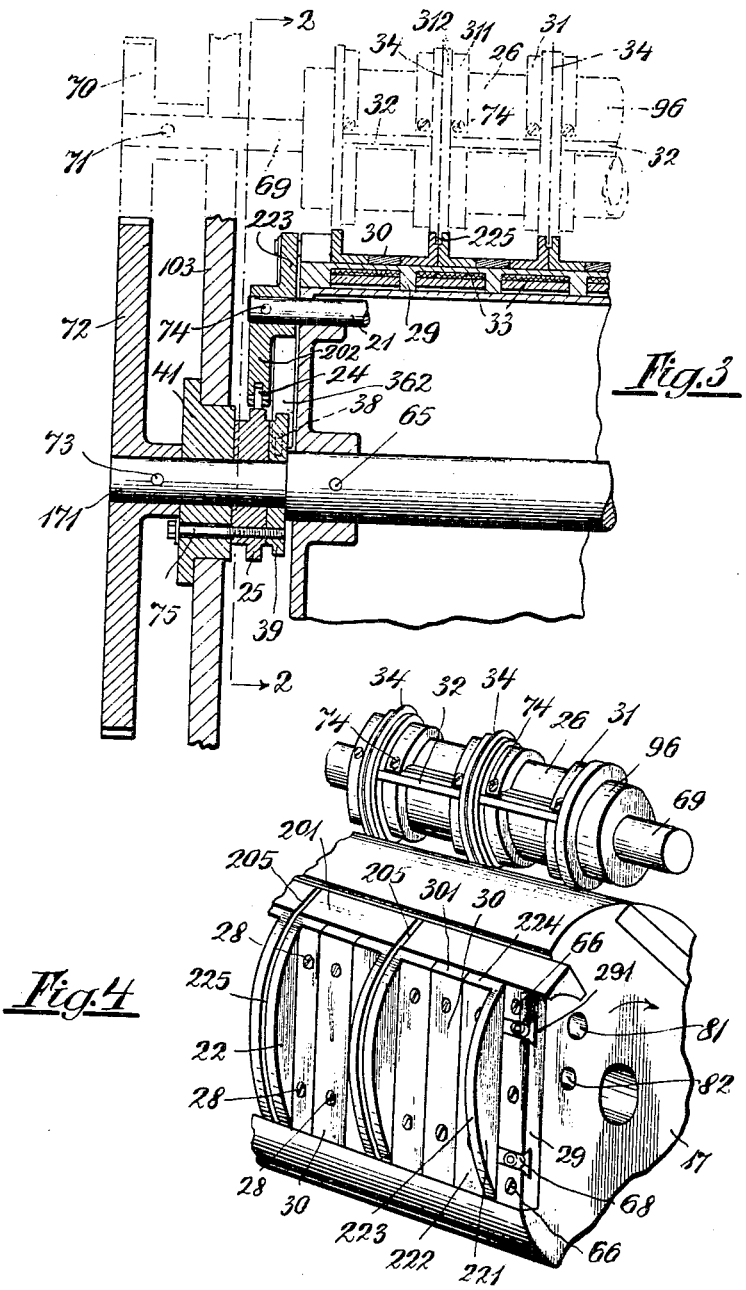
Inventors:
PETER WEISSHUHN AND
BY: ERICH JAGGLE Inventors:
Peter Weisshuhn and
Erich Jaggle

United States Patent Office 2,731,891
Patented Jan. 24, 1956

2,731,891

MACHINES FOR SEALING BAGS

Peter Weisshuhn, Stuttgart, and Erich Jäggle, Stuttgart-Feuerbach, Germany

Application September 23, 1952, Serial No. 310,985

Claims priority, application Germany September 25, 1951

3 Claims. (Cl. 93—13)

The present invention relates to a machine for manufacturing heat-sealed containers from a continuous heat-sealable film.

It is an object of the present invention to provide a machine which has a high output.

It is another object of this invention to provide a machine which is reliable in operation.

It is a further object of the present invention to provide a machine of compact and sturdy construction.

A machine according to the present invention comprises in combination a film transporting mechanism, cross-cutting means adapted to transversely cut the continuous film into sections, the cutting means moving in a fixed relationship to the other movable parts of the machine, a rotating main cylinder rotating in fixed relationship to the cutting means and the other movable parts of the machine, a plurality of gripper means being arranged on the main cylinder and preferably disposed by equal distances in circumferential direction, cam means mounted on the main cylinder and adapted to control the gripper means in fixed relation to the position of the main cylinder, a plurality of sealing means having sealing surfaces, said sealing means being arranged on the main cylinder and preferably disposed by equal distances in circumferential direction, a folding means adapted to double up the sections after the latter are gripped, a pressure roller rotating in a fixed relationship to the main cylinder, pressure means arranged on said pressure roller, said pressure means having pressure surfaces adapted to cooperate with the sealing surfaces of the sealing means.

Heating means for heating the sealing means may be arranged on the main cylinder. For a proper sealing action it is also possible to provide heating means in the pressure roller, whereby the pressure means are also properly heated.

In a preferred embodiment of the invention slitting means are arranged on the pressure roller for slitting the transversely cut-off sections of the film into a plurality of bag portions, the arrangement being such that the slitting occurs slightly in advance to the sealing action.

A further improvement of the machine according to the invention is achieved by providing a swingable ejector means for ejecting the sealed bags, said ejector means having an ejector rail, preferably comb-shaped, cam means secured to the main cylinder and adapted to control the swinging action of the ejector rail in such a manner that the ejector rail advances between the gripping and sealing means when the bags are completely sealed.

Figure 6:
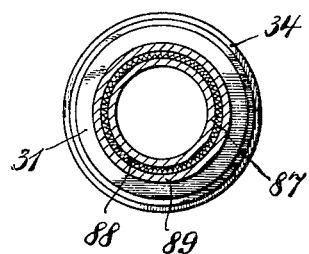
Figure 7:
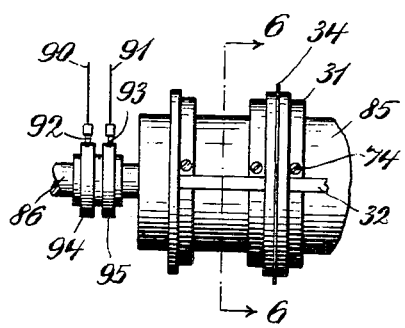

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows a side view of the machine on a reduced scale with the upper part in section taken on line 2—2 of Fig. 3, Fig. 2 shows a fragmentary sectional view taken on line 2—2 of Fig. 3, Fig. 3 shows a fragmentary sectional view taken on line 3—3 of Fig. 2 with the pressure roller represented in dot-dash lines, Fig. 4 shows a fragmentary perspective view of the main cylinder and the pressure roller, Fig. 5 shows an enlarged fragmentary detail view of the gripper and folding arrangement, Fig. 6 shows a fragmentary sectional view taken on line 6—6 of Fig. 7 of a pressure roller equipped with heating elements, Fig. 7 shows a fragmentary side view of the pressure roller of Fig. 6.

Referring to the Figures 1 to 5, 10 indicates a machine frame having a base 102, two side walls 103, one of which is broken away in Fig. 1 according to line 2—2 of Fig. 3 for clearly showing the details of the machine, and an extension 101 on which a spool 50 is rotatably mounted on bearing halves 52 with its shaft 51. Wound on the spool 50 is a coil 12 of suitable continuous film suitable for forming containers, as paper or other kinds of films. This film may be coated on one side with a layer of heat sealable material or this layer may be applied to the proper surfaces of the film by means known per se arranged in the machine, said means being not shown or described. From the coil 12 the film strip 121 runs to a guiding pulley 13 suspended from double-levers 53 which are swingably arranged on a shaft 54 mounted in the side walls 103. A spring 98 forces the pulley against the strip 121. The strip 121 is then passed on to a pair of driving rollers 14 and 15 arranged on shafts 55 and 56, which are rotatably mounted in the side walls 103. The lower roller 14 may be driven through a reduction gearing from an electric motor, both the reduction gearing and the motor being not shown in the drawing. The direction of rotation is indicated by the arrows A (roller 14) and B (roller 15). The strip 121 then passes a cutting device consisting of a lower stationary cutting blade 16 mounted on a rail 57, which is fastened to the side walls 103, and of an upper cutting blade 58 rigidly held on a supporting rail 59, which is secured to a driven shaft 60 mounted in the side walls 103. The driving means of shaft 60 are not shown in the drawing. The direction of rotation of the shaft 60 and thus of the cutting blade 58 is indicated by arrow C. From the cutting device the strip 121 advances to the main cylinder 17, passing between said cylinder 17 and a folding device to a supporting plate 19 mounted on a rail 67 secured to the side walls 103.

The folding device consists of a folding blade 61 rigidly secured by means of screws 65 to a rail 62 which is supported by two arms 63 connected to a shaft 64 which is rotatably mounted in the side walls 103. The shaft 64 is driven in the direction of the arrow D by means not shown in the drawing.

The main cylinder 17, which rotates in the direction of arrow E, is rigidly secured to a shaft 171 by means of a pin 65. Provided 120° apart on the circumference of the main cylinder 17 are recesses for heat-sealing elements which will be presently described especially with reference to Figs. 2, 3 and 4. To the flat bottom of the aforementioned recesses a heater plate 29 is secured by means of screws 66. In grooves of these heater plates 29 suitable electrical heating elements 33 are incorporated to which electric current is supplied by slip rings not shown in the drawing. The heating elements 33 may best be seen in Fig. 3. The heater plates 29 are provided with dove-tailed grooves 291 parallelly disposed to the axis of main cylinder 17 in which base blocks 68 fitted with a threaded hole are slidably arranged. On top of the heater plate 29 a number of sealing plates 22 are arranged with the sealing plates being fastened by means of screws 28 screwed into threaded holes of the base blocks 68. The sealing plates consist of a flat portion 222 and a segment-shaped portion 221, the two portions having sealing surfaces 223 and 224 respectively. Between the sealing plates 22 a spacer plate 30 is arranged, the plate being fastened to the heater plate 29 by screws 28 in a similar manner as plates 22. The spacer plates 30 have a forward sealing surface 301.

Outside the main cylinder 17 a pressure roller 26 is provided with its axis parallelly disposed to the axis of the main cylinder. The shaft 69 of the pressure roller 26 is rotatably mounted in the side walls 103 and rotated through a pinion 70 secured to the shaft 69 by means of a pin 71 and a large gear 72 secured to the shaft 171 by a pin 73 as may be seen from Fig. 3, the means for rotating the gear 72 being not shown in the drawing. Mounted on the shaft 69 is a cylinder 96, to which, by means of screws 74, pressure rings 31 having a ring-shaped portion 311 and a flange 312 are fastened, the latter cooperating with the surfaces 223 of the sealing plates 22. Mounted between two adjacent pressure rings 31 are slitting rings 34 extending somewhat beyond the surface of the pressure rings 31 and adapted to extend into a slot 115 of two adjacent sealing plate portions 221. The pressure rings 31 are not completely closed but have a cross slot into which a cross pressure rail 32 is rigidly mounted, the latter cooperating with the surfaces 224 and 301 of the sealing plates 22 and spacer plates 30 respectively.

The gripping and ejecting mechanisms are symmetrically arranged on either side of main cylinder 17 and consist of three units each spaced 120 degrees apart, of which only one will be described.

For gripping the strip 121 a two-armed gripper lever 20 is secured to a shaft 21 by means of a pin 74, the shaft 21 being rotatably arranged in a hole 81 of main cylinder 17. The inner arm 202 of said lever is fitted with a roller follower 24 rolling on a cam 25, which is mounted on the shaft 171 and secured to a block 41 by means of screws 75, the block 41 being rigidly connected to the respective side wall 103. The outer arm 203 carries a gripper rail 201 whose outer surface 204 is opposite to the surface 225 of the sealing plate 22 and the spacer plate 30. A tension spring 23 attempts to draw the roller follower 24 against the cam 25. Slots 205 are provided in the griper rail 201 for receiving the slitting rings shortly before slitting occurs.

The ejector comprises a two-armed lever 36 rigidly secured to a shaft 37 which is rotatably arranged in a hole 82 of the main cylinder 17. The inner arm 362 of the lever 36 carries a roller follower 38 rolling on a cam 39 which is also secured to block 41 by means of the aforementioned screws 75. A spring 40 presses the roller follower 38 against cam 39. On its outer arm 363 the lever 36 carries an ejector rail 361 whose outer portion is comb-shaped and meshes with a stacking comb 351 of a stacking table 35 on which a slidable block 76 is arranged for properly stacking the finished bags 77 (see Fig. 1). The table 35 is swivably mounted on a support 78 of frame 10, and its position may be changed by means of a screw 79 pivoted to the table 35 and in threaded connection with a nut 80 secured to frame 10.

Figs. 6 and 7 represent a modified pressure roller 85 having a shaft 86 on which a cylindrical body 87 is mounted. Arranged on the latter are ring-shaped heating elements 88 which are enclosed in suitable recesses of an outer cylinder 89. On the latter pressure rings 31, slitting rings 34 and a cross pressure rail 32 are provided as described before. The heating elements 88 are supplied with electric power through wires 90 and 91 connected to brushes 92 and 93 which bear on slip rings 94 and 95 mounted on shaft 86 and connected to the terminals of the heating elements 88.

The operation of the machine is as follows:

The strip 121 is drawn from the rotatable spool 50 by means of the pair of rollers 14 and 15, with the roller 15 being rotated in the direction of arrow A. The strip passes the cutting device with the cutting blades 16 and 58 being separated according to the position of the rotating supporting rail 59 to which the blade 58 is fastened and passes the folding device which is in inoperative position due to the position of the rotating shaft 64 and slides up near the end of the supporting plate 19. When the strip 121 has passed so far the rotating blade 58 carries out a transverse cut of the strip by passing the stationary blade 16, whereby a strip section 83 is cut off (see Fig. 1). The main cylinder 17 is now in a position as shown in Figs. 1 and 2 with the backward edge 204 of the gripper lever 20 arranged at a small distance from the forward edge 225 of the sealing plates. Immediately following the cut the folding plate 61 passes this space when rotating in the direction of arrow D and presses the cut-off strip section against the backward edge 225 of the gripper rail 201, whereupon the gripper lever 20 is swung by means of cam 25 against the forward edge 204 of the sealing plates with the result that the center portion of the strip section 83 is gripped between the edges 204 and 225.

During the aforedescribed operation the main cylinder 17 rotates in the direction of arrow E, and after the gripping being effected, the section is carried along with the cylinder 17 and is doubled up by being drawn along the inner transverse edge of the supporting plate 19.

When this doubled-up strip section 83 arrives underneath the pressure roller 26, the slitting rings 34 divide the section into a number of bag positions, each corresponding to the film required for one bag. Shortly after this slitting action has started the cross pressure rail 32 is pressed against the sealing surfaces 224 and 301 which are heated due to the action of the heating elements 33, whereby the sections 83 are transversely sealed. During the slitting action the slitting ring 34 penetrates in part into the slots 205 of the gripper bar 201 and thereafter into the slots 225 between the portions 221 of the sealing plates 22. Upon further rotation of the cylinder 17 and of the presser roller 26 the section 83 is further slit and with a slight lag sealed on the lengthwise edges of the bag portions, with the surfaces 312 of the presser rings 31 being forced against the heated surfaces 223 of the sealing plates 22 between which the edges of the bag portions are pressed together.

Upon further rotation of cylinder 17 the sealed bags 77 are removed from the cylinder. This is achieved by swinging the gripper lever 20 somewhat under the action of cam 25 on which the roller follower 24 is guided, with the effect that the folded bottoms of the bags 77 are released. In order to assure removal of the bags 77, the ejector rail 361 is advanced through the space produced between the edges 204 and 225 to such an extent that the rail extends with its comb-shaped portion somewhat beyond the surface of the cylinder 17 and meshes with the stacking comb 351 of the stacking table 35, on which the bags 77 are deposited.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What we claim as new and desire to secure by Letters Patent is:

1. Machine for manufacturing heat-sealed bags from a continuous heat-sealable film, comprising in combination a film transporting mechanism, cross-cutting means adapted to transversely cut the continuous film into sections, the cutting means moving in a fixed relationship to the other movable parts of the machine, a rotating main cylinder rotating in fixed relationship to the cutting means and the other movable parts of the machine, a plurality of gripper means being arranged on the main cylinder and preferably disposed by equal distances in circumferential direction, cam means mounted on the main cylinder and adapted to control the gripper means in fixed relation to the position of the main cylinder, a plurality of sealing means having sealing surfaces, said sealing means being arranged on the main cylinder and preferably disposed by equal distances in circumferential direction, a folding means adapted to double up the sections after the latter are gripped, a pressure roller rotating in a fixed relationship to the main cylinder, pressure means arranged on said pressure roller, said pressure means having pressure surfaces adapted to cooperate with the sealing surfaces of the sealing means, swingable ejector means for ejecting the sealed bags, said ejector means having an ejector rail, preferably comb-shaped, cam means secured to the main cylinder and adapted to control the swinging action of the ejector rail in such a manner that the ejector rail advances between the gripping and sealing means when the bags are completely sealed.

2. Machine for manufacturing heat-sealed bags from a continuous heat-sealable film, comprising in combination a film transporting mechanism, cross-cutting means adapted to transversely cut the continuous film into sections, the cutting means moving in a fixed relationship to the other movable parts of the machine, a rotating main cylinder rotating in fixed relationship to the cutting means and the other movable parts of the machine, a plurality of gripper means being arranged on the main cylinder and preferably disposed by equal distances in circumferential direction, cam means mounted on the main cylinder and adapted to control the gripper means in fixed relation to the position of the main cylinder, a plurality of sealing means having sealing surfaces, said sealing means being arranged on the main cylinder and preferably disposed by equal distances in circumferential direction, a folding means adapted to double up the sections after the latter are gripped, a pressure roller rotating in a fixed relationship to the main cylinder, pressure means arranged on said pressure roller, said pressure means having pressure surfaces adapted to cooperate with the sealing surfaces of the sealing means, slitting means arranged on the pressure roller for slitting the sections into a plurality of bag portions, the arrangement being such that the slitting occurs slightly in advance to the sealing action, swingable ejector means for ejecting the sealed bags, said ejector means having an ejector rail, preferably comb-shaped, cam means secured to the main cylinder and adapted to control the swinging action of the ejector rail in such a manner that the ejector rail advances between the gripping and sealing means when the bags are completely sealed.

3. Machine for manufacturing heat-sealed bags from a continuous heat-sealable film, comprising in combination a film transporting mechanism, cross-cutting means adapted to transversely cut the continuous film into sections, the cutting means moving in a fixed relationship to the other movable parts of the machine, a rotating main cylinder rotating in fixed relationship to the cutting means and the other movable parts of the machine, a plurality of gripper means being arranged on the main cylinder and preferably disposed by equal distances in circumferential direction, cam means mounted on the main cylinder and adapted to control the gripper means in fixed relation to the position of the main cylinder, a plurality of sealing means having sealing surfaces, said sealing means being arranged on the main cylinder and preferably disposed by equal distances in circumferential direction, a folding means adapted to double up the sections after the latter are gripped, a pressure roller rotating in a fixed relationship to the main cylinder, pressure means arranged on said pressure roller, said pressure means having pressure surfaces adapted to cooperate with the sealing surfaces of the sealing means, slitting means arranged on the pressure roller for slitting the sections into a plurality of bag portions, the arrangement being such that the slitting occurs slightly in advance to the sealing action, swingable ejector means for ejecting the sealed bags, said ejector means having an ejector rail, preferably comb-shaped, cam means secured to the main cylinder and adapted to control the swinging action of the ejector rail in such a manner that the ejector rail advances between the gripping and sealing means when the bags are completely sealed, heating means arranged in the neighborhood of the sealing means and the pressure means for heating said sealing and pressure means.

References Cited in the file of this patent

UNITED STATES PATENTS

| Re. 8,900 | Crowell | Sept. 16, 1879 |
|---|---|---|
| 1,485,141 | Macdonald | Feb. 26, 1924 |
| 1,990,892 | Becker et al. | Feb. 12, 1935 |
| 2,083,617 | Salfisberg | June 15, 1937 |
| 2,119,754 | Sinkovitz et al. | June 7, 1938 |
| 2,275,976 | Mead | Mar. 10, 1942 |
| 2,333,440 | Potdevin | Nov. 2, 1943 |